United States Patent [19]

Gilbert

[11] Patent Number: 5,109,900
[45] Date of Patent: May 5, 1992

[54] TREE-FELLING HEAD

[76] Inventor: Sylvain Gilbert, 1641, St-Dominique, Roberval, Quebec, Canada, G8H 2P1

[21] Appl. No.: 672,406

[22] Filed: Mar. 20, 1991

[51] Int. Cl.⁵ .............................................. A01G 23/08
[52] U.S. Cl. .................................. 144/339; 144/2 Z; 144/3 D; 144/34 E
[58] Field of Search ................... 144/2 Z, 3 D, 34 R, 144/34 E, 33 S, 336, 339

[56] References Cited

U.S. PATENT DOCUMENTS

| | | | |
|---|---|---|---|
| 3,542,099 | 11/1970 | Gibson | 144/339 |
| 3,795,264 | 3/1974 | Coughran, Jr. | 144/34 R |
| 3,875,983 | 4/1975 | Kurelek | 144/34 R |
| 3,910,326 | 10/1975 | Tucek | 144/34 R |
| 3,994,325 | 11/1976 | Cryder et al. | 144/34 E |
| 4,022,259 | 5/1977 | Sturtz, Jr. | 144/339 |
| 4,131,145 | 12/1978 | Puna | 144/34 E |
| 4,243,258 | 1/1981 | Dauwalder | 144/34 E |
| 4,793,389 | 12/1988 | Sigouin et al. | 144/34 R |

Primary Examiner—W. Donald Bray
Attorney, Agent, or Firm—Pierre Lespérance

[57] ABSTRACT

A felling head for successively grabbing a number of upstanding trees, sequentially sectioning same, and capturing a number of sectioned tree sections one at a time to constitute a pack of sectioned tree sections held by the head, before it is required to unload the tree sections. The felling head has a ground-skimming horizontal knife that cuts trees, while a pair of upper grabber arms and a tree retaining lever capture that tree. The grabber arms then release the sectioned tree section, for engagement with a second upstanding tree, while the retaining lever retains the sectioned tree against the head.

10 Claims, 9 Drawing Sheets

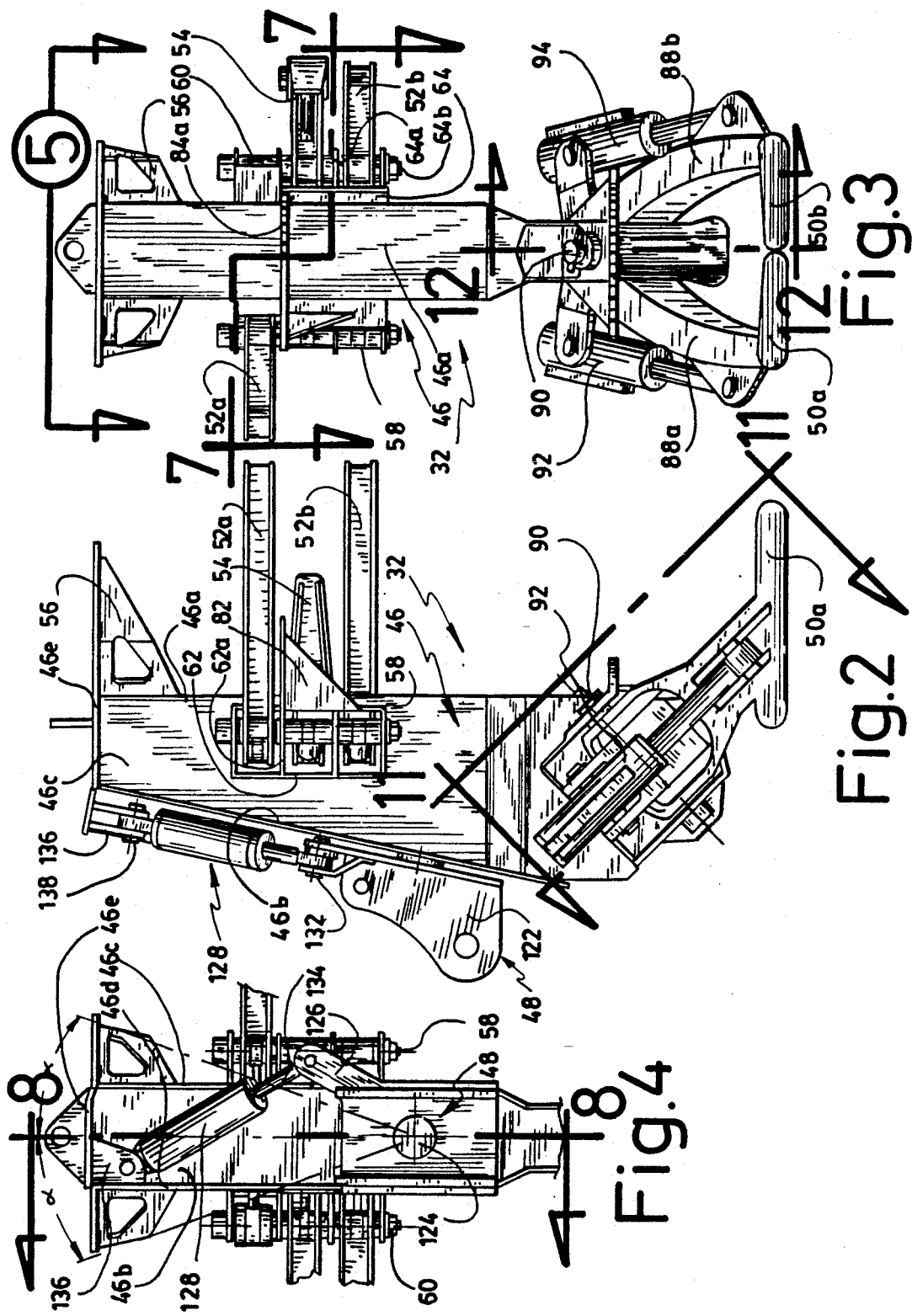

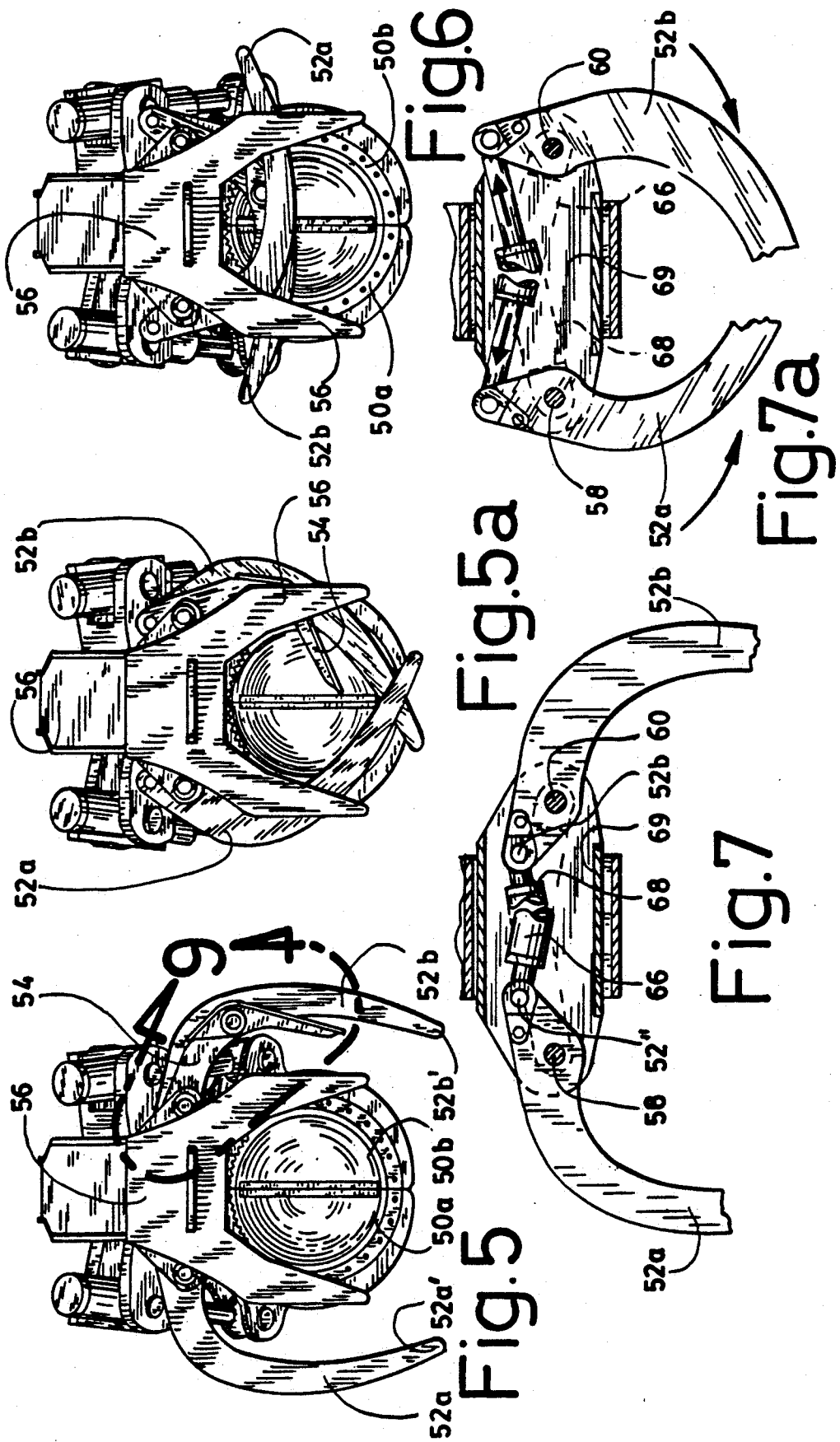

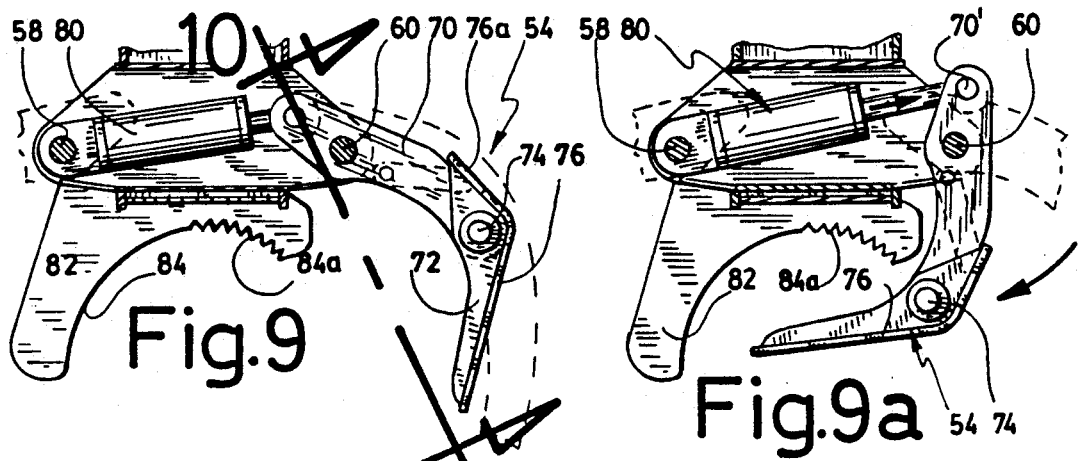
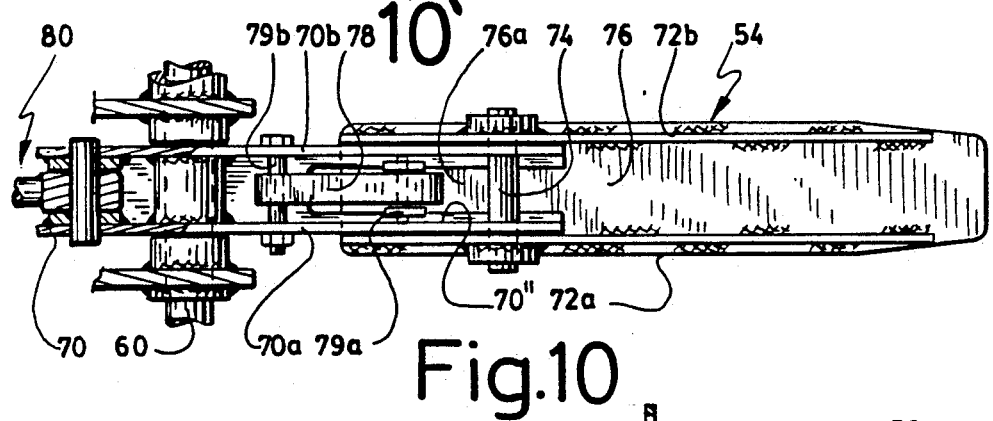
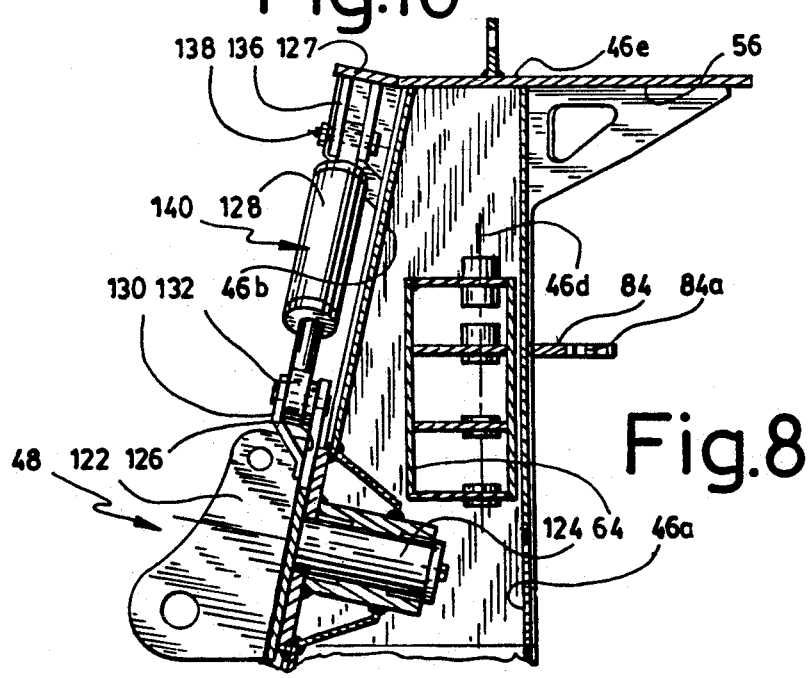

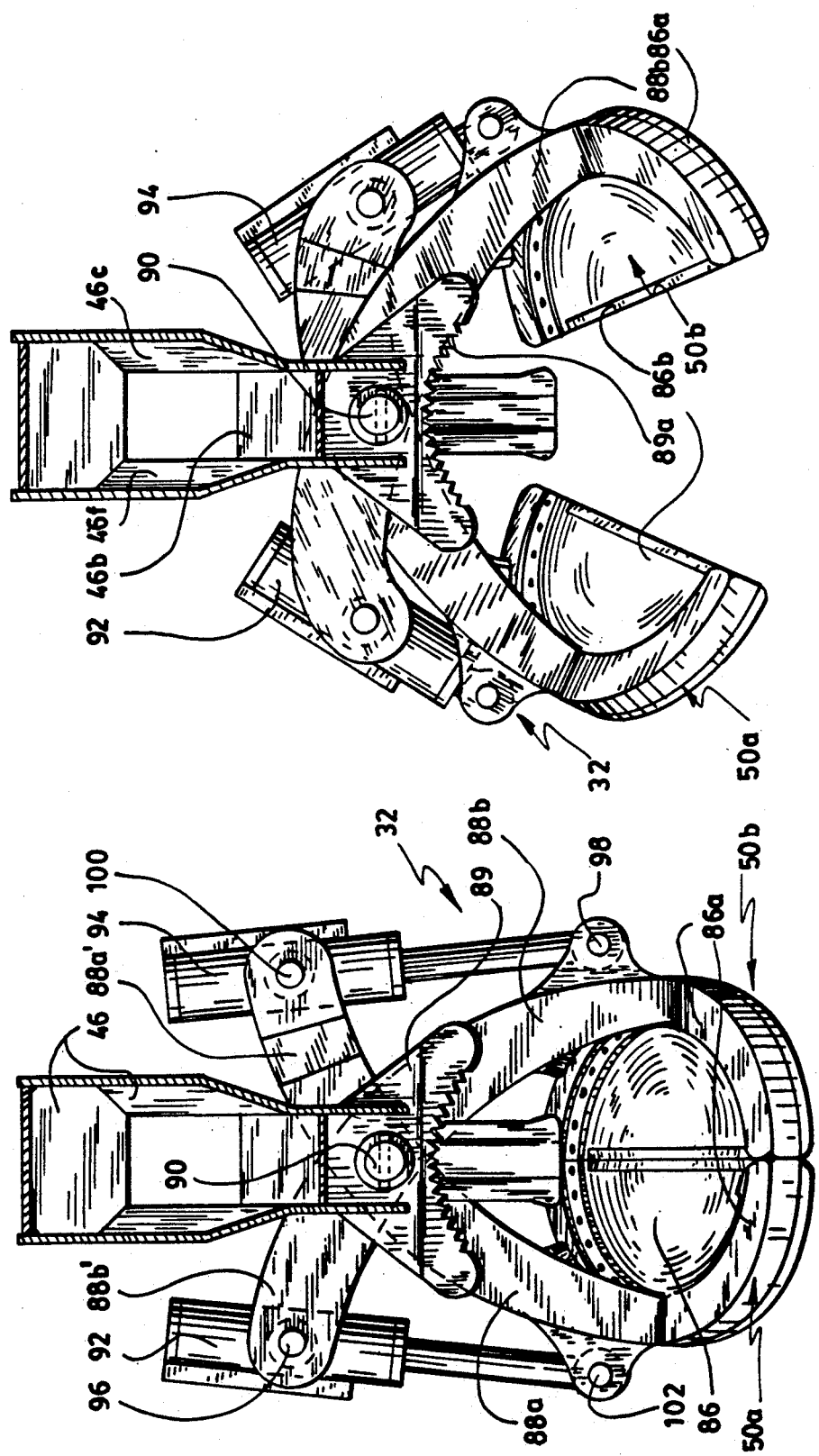

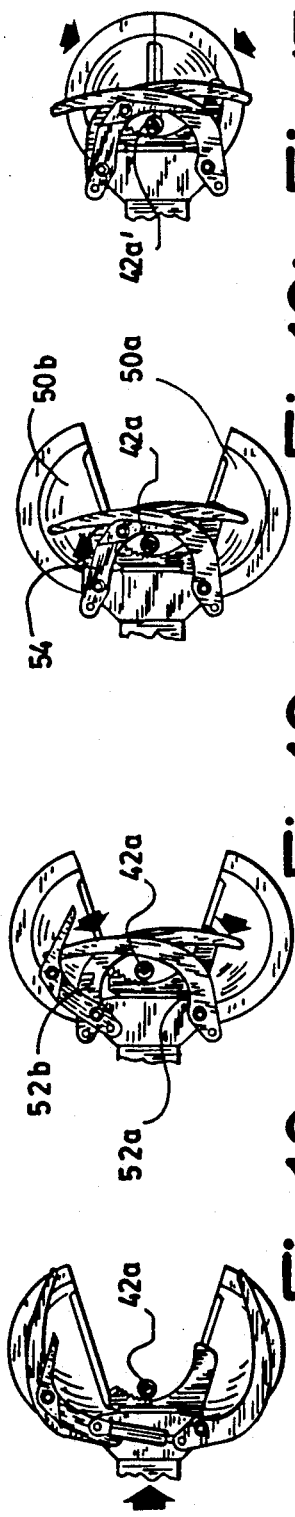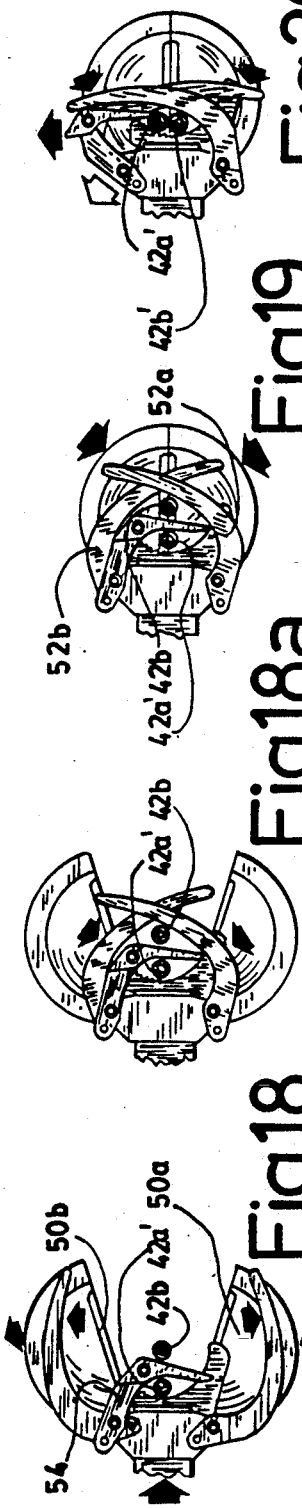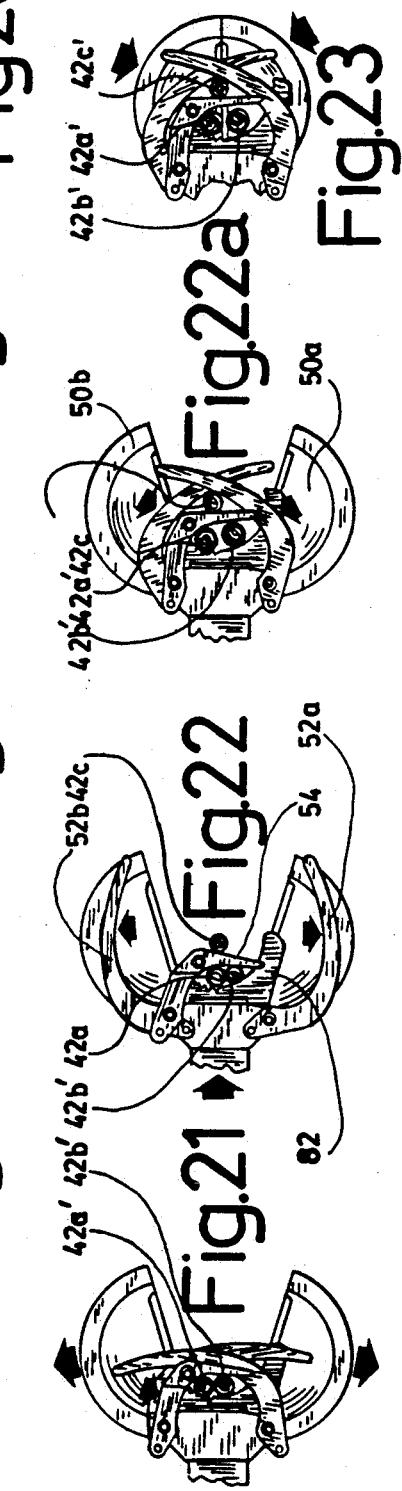

TREE-FELLING HEAD

FIELD OF THE INVENTION

This invention relates to apparatuses for cutting upstanding trees in forests, capturing the sectioned tree, collecting the sectioned trees, and transporting same to an unloading area.

BACKGROUND OF THE INVENTION

Known felling heads are installed to the outer end of a power operated boom carried by a forest-going vehicle. The existing prior art felling heads have a knife, for felling a standing tree, and grabber arms, for capturing and retaining above ground the cut section of the tree, usually maintaining its original vertical position. Usually, the cut tree section must be released and unloaded into a transport truck before the felling head can be used for felling a second upstanding tree.

OBJECTS OF THE INVENTION

The prime object of the invention is to increase the efficiency of deforestation operations, by providing a tree felling head capable of sequentially sectioning a plurality of standing trees and capturing all of same before release and unloading thereof as a pack is required.

A corollary object of the invention is to reduce the time required to clear a forest area by large tree felling machines.

A general object of the invention is to simplify the work of forest workers.

SUMMARY OF THE INVENTION

Accordingly with the objects of the invention, there is disclosed a feller buncher unit for use with an automotive vehicle in a forest, said vehicle of the type having an elongated boom, said feller buncher comprising: (a) a main rigid frame; (b) coupler means for connecting said feller buncher main frame to said boom; (c) ground skimming knife means, carried by said main frame for cutting an upstanding tree about a horizontal plane proximate ground level; (d) grabber means, for capturing and retaining in substantially upright position the tree section cut by said knife means, within a loading area; (e) a retaining member, for retaining said cut tree section captured by said grabber means within said loading area; wherein said retaining member consists of two endwisely pivoted inner and outer lever members, the inner lever member pivoted to said main frame by a pivot means for pivotal motion of said inner and outer lever members about a horizontal plane, and further including stop means to prevent pivotal motion of said outer lever member relative to said inner lever member beyond a right angle limit position directed towards said tree loading area, and power means to power operate said inner lever member in its pivotal motion; wherein at least a second upstanding tree can be thereafter captured by said grabber arms, and cut by said knife means, before release of both cut trees from said loading area is required.

Preferably, means are provided for relative movement of said unit main frame relative to said boom, and additional power means for relative displacement of said feller buncher unit along roll and pitch axes.

Advantageously, biasing means are provided to bias said outer lever member against said stop means in its said right angle position relative to said inner lever member.

Profitably, said unit main frame includes two transversely spaced, vertical axles, said grabber means including two vertically spaced apart grabber arms, pivotally pivotally carried by one of said vertical axles and vertically carried by respective said vertical axles, said inner lever member offset relative to said grabber arms, and further including additional power means to power operate said grabber arms in their pivotal motions. Each grabber arm could be lengthwisely arcuate to conform tangentially to the circular shape of the upstanding tree to be captured. Moreover, said additional power means include a pair of ram members, each ram member pivoted about second pivot axles to an inner end extension of a corresponding grabber arm and extending freely through a transverse passage in said unit main frame whereby, upon pivotal action of said grabber arms from an open, spread-apart condition, clearing said tree loading area, to a closed condition, superimposed over one another within said loading area, the first mentioned pair of grabber pivot axles shift from closer positions from one another within the area between said pair of second pivot axles to farther positions from one another beyond this area.

It is envisioned that said knife means includes a pair of semi-circular plates, each having a straight cutting edge, each plate edgewisely carried by an arcuate arm defining inner and outer ends, an arm pivot means pivotally interconnecting an intermediate section of said arcuate arms to said feller main frame, and a pair of ram members, one ram member pivotally interconnecting the inner end of one arcuate arm with the outer end of the other arcuate arm and the other ram member pivotally interconnecting the outer end of said one arcuate arm with the inner end of said other arcuate arm; whereby in the extended condition of said ram members, the straight cutting edges of said semi-circular knife plates meet about a horizontal plane. Each said knife plate could then be preferably convexly shaped relative to the ground.

It would be most efficient if said retainer outer lever member would be smooth-surfaced and tapering towards a thin free end tip, to facilitate disengagement from said loading area from in between the cut tree sections secured by said grabber means.

The invention also relates to a method of cutting upstanding trees in a forest with a feller buncher unit, the feller buncher defining a frame carrying ground skimming cutting knives, grabber arms, a tree retaining lever, all pivotally carried about vertical axes for pivotal motion about vertically offset horizontal axes, and each powered by corresponding ram means; the method comprising the following steps: (a) engaging with the feller unit a standing tree; (b) capturing the standing tree with the grabber arms; (c) retainingly engaging said captured tree with said retaining lever; (d) sectioning the tree with said cutting knives; (e) releasing said sectioned tree with said grabber arms and knives; (f) engaging a second standing tree with the feller unit; (g) retainingly engaging against said retaining lever section said second standing tree retained by said retaining lever; and (h) sectioning the second standing tree with said knives.

Preferably, the method would comprise the following additional steps (with said retaining lever consisting of two endwisely pivoted inner and outer lever sections): (i) releasing the first sectioned tree with said outer lever section, and thereafter retainingly engaging both tree sections therewith; (j) releasing both sectioned tree sections with said grabber arms and knives; (k) engaging a third standing tree with the feller unit; (l) capturing said third tree against said retaining lever outer lever section with said grabber arm; and (m) sectioning said third tree with said knives.

BRIEF DESCRIPTION OF THE DRAWINGS

FIG. 2 is an enlarged view of the feller head from FIG. 1;

FIG. 3 is a front elevation of the feller head, as taken from perspective 3 of FIG. 1;

FIG. 4 is a fragmentary, rear elevation of the feller head;

FIGS. 5, 5a and 6 are top end views of the feller head, sequentially showing the pivotal movement of the grabber arms from their closed to their opened positions, as taken about perspective 5 of FIG. 3;

FIGS. 7-7a are partly broken, cross-sectional views taken along broken line 7—7 of FIG. 3, sequentially suggesting how the grabber arms are pivotally actuated by ram means from their open to their closed positions;

FIG. 8 is a sectional view taken along line 8—8 of FIG. 4;

FIGS. 9-9a are enlarged, partly broken views of the area 9 in FIG. 5, sequentially suggesting the play of the retaining lever from its loading position to its tree-retaining position;

FIG. 10 is an enlarged sectional view taken along line 10—10 of FIG. 9;

FIGS. 11-11a are enlarged sectional views of the feller head taken from perspective 11 of FIG. 2, sequentially suggesting how the jaws thereof can be pivotally moved from their closed position to their opened position;

FIGS. 16-23 are top end views of the feller unit, along line 16—16 of FIG. 15, and sequentially suggesting how the tree felling head is to be operated, namely:

in FIG. 16, how a standing tree is engaged by the feller head of the invention;

in FIG. 16a, the upper grabber arms closingly capturing the tree;

in FIG. 16b, the upper retaining lever closing upon the captured tree;

in FIG. 17, the lower jaws closingly sectioning the captured tree;

in FIG. 18, the lower jaws and the grabber arms releasing the sectioned tree portion, and the truck designed to be thereafter moved to bring the feller head to engage a second standing tree to tangentially abut against the closed retaining lever;

in FIG. 18a, the grabber arms capturing a second standing tree by partially pivotally closing thereon the first sectioned tree portion;

in FIG. 19, the jaws closingly sectioning onto the second standing tree;

in FIG. 20, the grabber arms completing their closing movement and the retaining lever then openingly releasing the first sectioned tree portion, to bring both cut tree sections together;

FIG. 20b is a view similar to FIG. 20a, but showing how a plurality of cut tree sections can be retained to the felling head by the grabber arms, as conveniently as when only two cut tree sections are retained to the felling head by the same grabber arms, FIG. 20b further showing the retainer lever in inoperative, released position compared to the operative position thereof in FIG. 20a;

in FIG. 21, the retaining lever closing against the two sectioned tree portions, while the knife jaws are pivotally opened;

in FIG. 22, the grabber arms releasing the two sectioned tree portions, to enable the truck to move to a third standing tree wherein the latter can be engaged by the felling head;

in FIG. 22a, the grabber arms capturing the third standing tree; and in FIG. 23, the jaws sectioning the third standing tree.

DETAILED DESCRIPTION OF THE INVENTION

Figure 1:
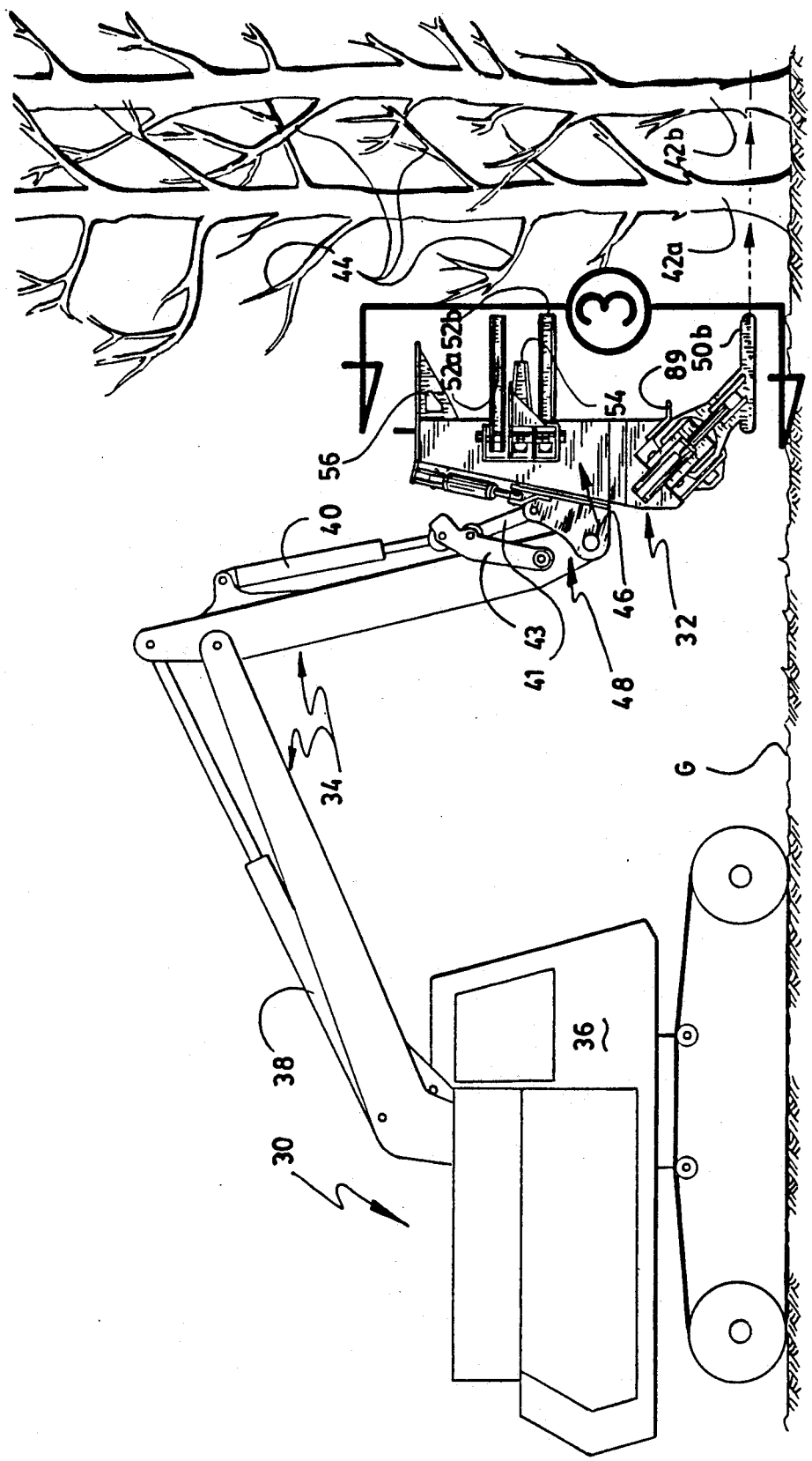
FIG. 1 is a side elevation of a feller-buncher truck, provided with a boom-mounted tree felling head according to the invention, in operative position within a forest.
Figure 12:
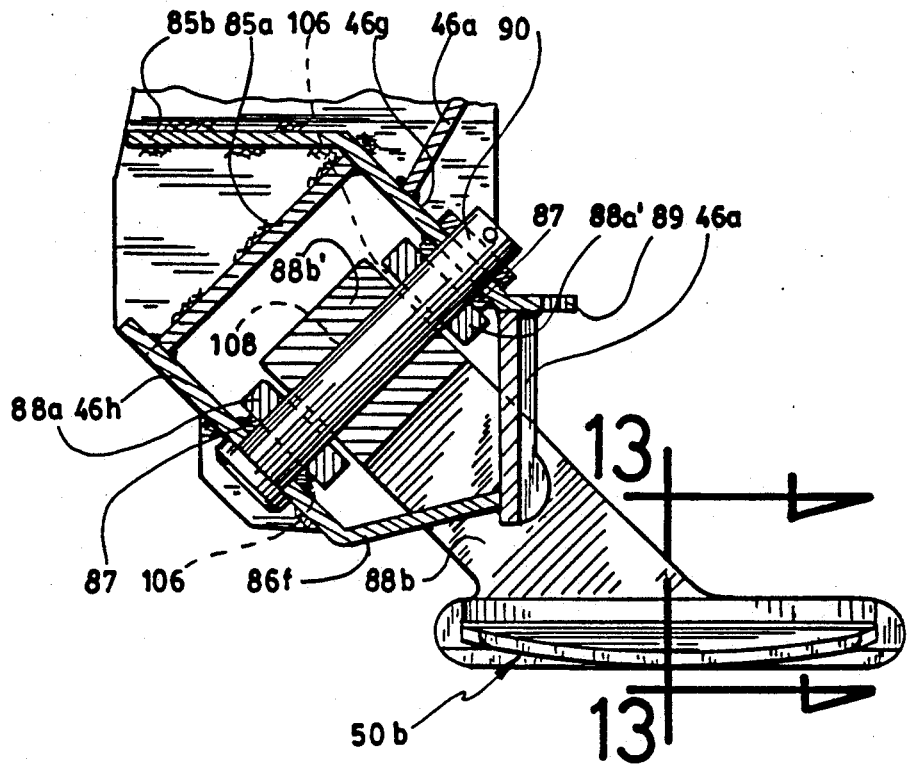
FIG. 12 is an enlarged sectional view taken along line 12—12 of FIG. 3.

Wheel carried truck 30 carries a boom-mounted, tree felling head 32, constructed in accordance with the invention. Pivoted boom 34 is hydraulically controlled by an operator in the truck cabin 36, via hydraulic lines operating ram means 38, 40, 41 in a conventional fashion, wherein head 32 is movable at least along elevational and azimuthal directions and about roll and pitch axes. A floating arm 43 pivoted to boom 34 pivotally interconnects outer end rams 40 and 41. Truck 30 is specifically adapted to circulate over the ground G of a forest made of a plurality of ground standing trees 42, such as 42a, 42b, 42c, . . . each tree having numerous transverse limbs 44. All this is known.

The felling head of the invention, 32, consists of a main rigid frame 46, carried by boom 34 via a pivot mount 48. The frame 46 itself carries: a pair of ground skimming, coacting jaw members 50a, 50b; intermediate, coacting, tree grabbing arm members 52a, 52b; and an intermediate tree retaining lever member 54. Preferably, the top end of chassis 46 carries an upright stay 56, for abuttingly transversely supporting an upstanding felled tree section thereagainst.

More particularly, in the operative, upstanding position of head 32 illustrated in FIG. 1, main frame 46 consists of a front wall 46a, rear wall 46b, two spaced side walls 46c and 46d, and top and bottom ends 46e and 46f. The rear wall 46a is upwardly forwardly inclined relative to the front wall 46a. Parallel cylindrical axles 58, 60 are anchored to each outer side wall 46c, 46d respectively spaced therefrom by brackets 62 and 64. Axles 58 and 60 are substantially parallel to front and side walls 46a–46c. As shown in FIGS. 2-3, grabber arm 52a is pivotally freely carried by axle 58, while grabber arm 52b and retaining lever 54 are both pivotally freely carried by a single axle 60. Bracket 62 includes an integral seat 62a, freely supporting the pivoted end of grabber arm 52a, at an upper position (i.e. toward the casing top end 46e), while bracket 64 includes intermediate and lower integral seats 64a and 64b, freely supporting the pivoted end of retaining lever 54 below the horizontal plane intersecting upper grabber arm 52a and of lower grabber arm 52b below the horizontal plane intersecting the retaining lever 54 (when viewed in FIG. 1).

As illustrated in FIGS. 5-7a, each grabber arm 52a, 52b is rigid, arcuate, defining a free end tip 52a', 52b', and an inner end tip 52a", 52b", with the respective pivot mount 58/60 intermediate tips 52a'/52b' and 52a"/52b" but proximate the latter tips. A hydraulic ram 66 operatively pivotally interconnects the grabber arm inner tip 52a" to the opposite grabber pivot axle 60, while a second hydraulic ram 68 operatively pivotally interconnects the other grabber inner tip 52b" to the opposite grabber pivot axle 58. Rams 66, 68 extend through a free passage 69 made transversely of casing 46 through apertures in side walls 46c, 46d.

As illustrated in FIGS. 9-9a and 10, retainer member 54 is made of two endwisely pivotally interconnected legs 70, 72 with inner leg 70 defining an inner tip 70' and an outer tip 70" connected to leg 72 by pivot axle 74. Pivot axle 60 freely extends through a section of inner leg 70 intermediate tips 70" and 70' proximate the latter, axle 60 being parallel to pivot axle 74. Outer leg 72 includes an edgewise flange 76 having a seat portion 76a extending beyond pivot 74 so as to define a limit position where inner leg 70 abuts against seat 76a when legs 70 and 72 are substantially orthogonal. Accordingly, outer leg 72 can pivot freely from its said limit position, up to a quarter of a turn where it will abut against leg 72 in substantially parallel fashion. However, outer leg 72 is biased to its limit position (orthogonal to leg 70 as shown in FIG. 9) by a biasing means 78. For example, biasing means 78 will be an elastic rubber band (FIG. 10), fixedly endwisely anchored to the interior faces of the flange 76 and leg 70 at two spaced positions intermediate pivots 60 and 74, by transverse pins 79a and 79b, respectively. Preferably, each leg 70, 72 is made of two elongated spacedly interconnected plates 70a, 70b and 72a, 72b with leg 70 narrower than leg 72 so that the outer end of the former can fit within the hollow of the latter's inner end, as in FIG. 10. Hydraulic ram 80 operatively pivotally interconnects tip 70' to main pivot axle 58.

Hence, pivot axles 58, 60 define a common vertical plane, on the one "outer" side of which the standing trees 42 are to engage the felling head front wall 46a, and on the "inner" side of which the pivoted end 70' of the tree retainer lever 54 is movable between an inoperative tree loading position, in which pivoted end 70' is located between the vertical planes passing through the pivot axles 58, 60 orthogonal to their said common vertical plane, to a tree retaining position, in which pivoted end 70' is located substantially beyond said vertical plane of pivot axle 60 and orthogonal to said common plane of pivot axles 58-60.

Hence, upper grabber arm 52a, intermediate retainer lever 54 and lower grabber arm 52b, are pivotally movable within three parallel, horizontal planes, independently from one another, under power from ram means 66, 68 and 80. Ram means 66, 68 are designed to be operated concurrently.

Preferably, a tree support plate 82 is transversely anchored to frame 46, and extends forwardly of front wall 46a being located between upper grabber arm 52a and intermediate lever 54. Plate 82 has a large arcuate notch 84 provided at its inner edge section with edgewise serrated teeth 84a. Teeth 84a are designed to tangentially grip a tree 42 having engaged head 32, i.e. engaged closely to but spacedly from front wall 46a. Accordingly, the tree section to be cut is to be captured by arm 54 for bringing the tree section within an area circumscribed by arcuate edge 84 on one side and arcuate arms 70, 72 of arm member 54 on the other end.

As illustrated in FIGS. 11-14, jaw members 50a, 50b each consists of a semi-circular disc portion 86, defining an arcuate edge section 86a and a straight edge section 86b. Straight edge 86b is bevelled and sharpened, to constitute a knife for compressingly cutting through a section of tree 42. Accordingly, jaw members 50a, 50b and especially straight edge sections 86b, must be of a very strong material, e.g. tempered steel. Two arcuate legs 88a, 88b pivotally interconnect the bottom end section 46f of main feller head frame 46 to the arcuate edge section 86a of flat jaw members 50a, 50b, respectively, about pivot axle 90. Axle 90 is a bolt extending completely through the body of casing 46, being anchored by large nuts 87 (FIG. 12) to two front and rear wall sections 46g and 46h respectively of frame 46, these two latter wall sections being parallel to one another and being approximately at a 45 degree angle relative to the plane of front and rear walls 46a and 46b. Transverse trusses 85a, 85b reinforce the frame structure by interconnecting walls 46a, 46b and 46f of the unit main frame 46.

Figure 15:
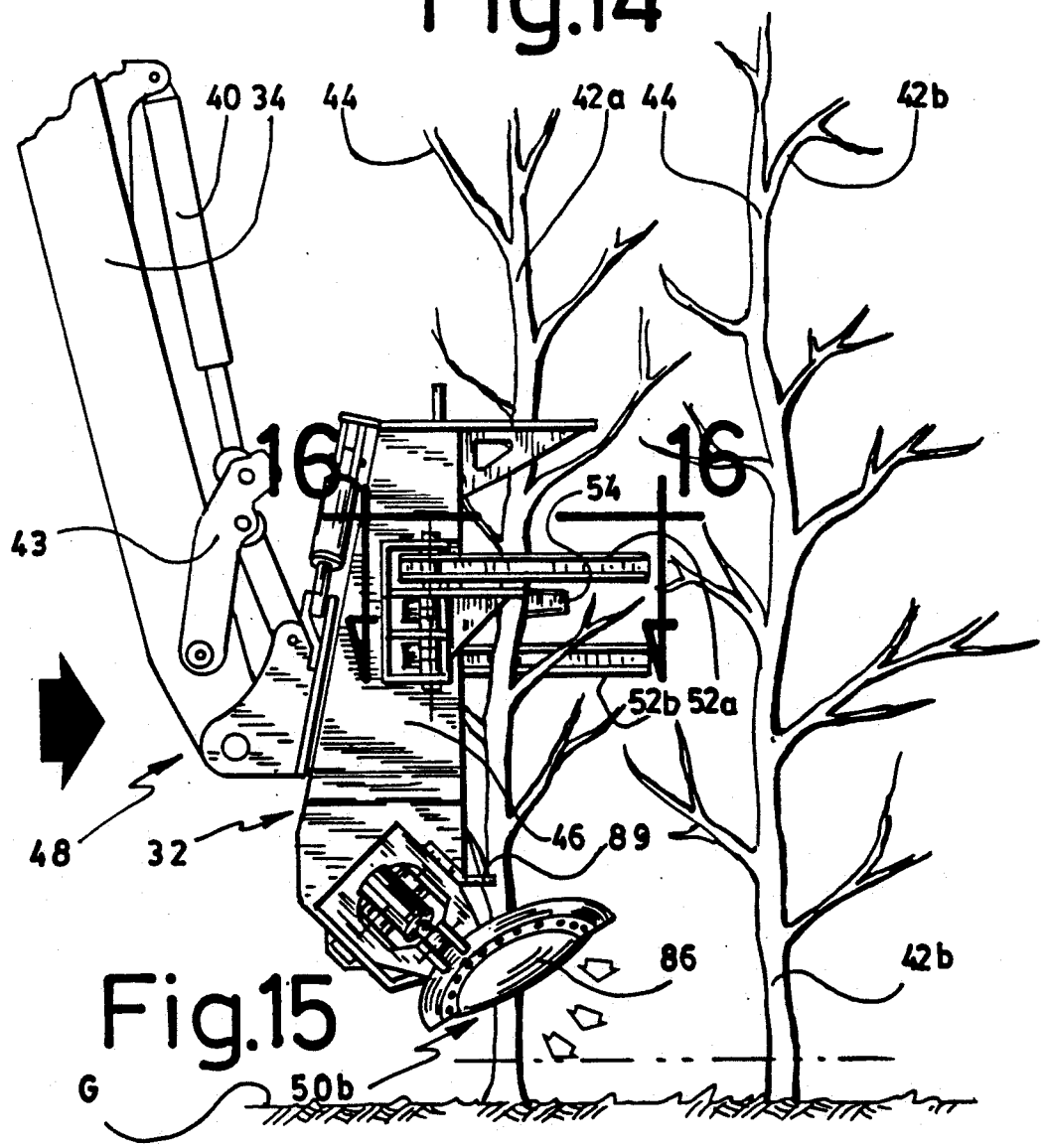
FIG. 15 shows in side elevation the boom-mounted feller head of the invention, in operation during the initial tree felling step.

Axle 90 extends along a forwardly upwardly inclined direction, relative to the vertical front wall 46a. Accordingly, jaw members 50a, 50b are pivotally movable from a first limit position, where both knives 86b edgewisely abut one another along a common horizontal plane (FIGS. 1 and 11) to a second limit position, where the disc portions 86 of the jaws 50a, 50b are spaced apart from one another and upwardly outwardly inclined along two planes substantially at right angle to one another (FIGS. 11a and 15). Hydraulic rams 92, 94 power operate jaws 50a, 50b. Ram 92 is pivotally connected at one end 96 to a pivotwise extension 88b' of jaw leg 88b, and at the other end to an ear 98 radially outwardly protruding from the base of leg 88b; while ram 94 is pivotally connected at one end 100 to a pivotwise extension 88a' of jaw leg 88a, and at the other end to an ear 102 radially outwardly protruding from the base of leg 88a. Hence, when knives 86b edgewisely close on each other, rams 92, 94 should be substantially parallel to one another and vertical, to provide maximum tangential effort about the orthogonal plane of horizontal disc 86.

Figure 14:
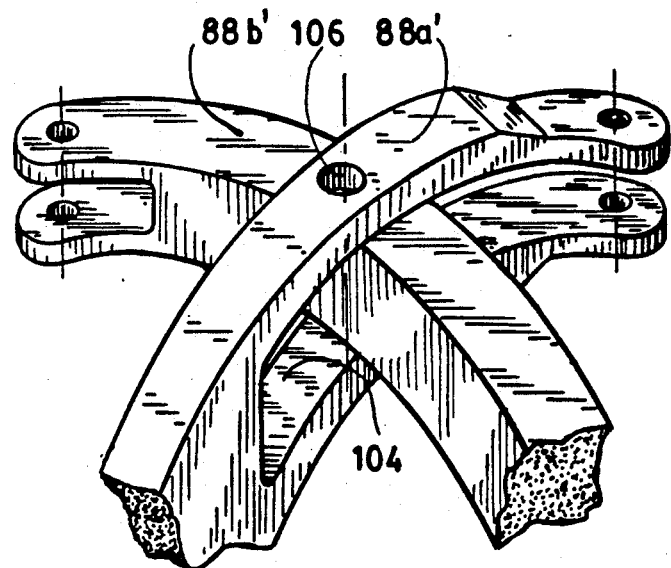
FIG. 14 is an enlarged, broken, isometric view of the jaws pivotal mount to the feller head.

Preferably, as illustrated in FIG. 14, the upwardly extending legs 88a, 88b of jaws 50a, 50b are pivotally engaged by pivot axle 90 in the following fashion: a thicknesswise aperture 104 is made into the inner end section 88a' of arm 88a, through which freely extends a diametrally smaller inner end section 88b' of the second arm 88b. A through-bore 106, 108 is made into inner end sections 88a', 88b' respectively, for through engagement by axle 90.

Profitably, as shown in FIG. 11, the bottom end of casing 46 carries a further abutment plate 89 with a large notch 89a provided with plurality of serrations again for tangentially gripping the captured tree section as Was the case for tangential abutment plate 82. Abutment plate 89 extends above knives 86, substantially parallel to arms 52a, 52b and 54 (FIG. 1), approximately at the level of pivot axle 90.

Figure 13:
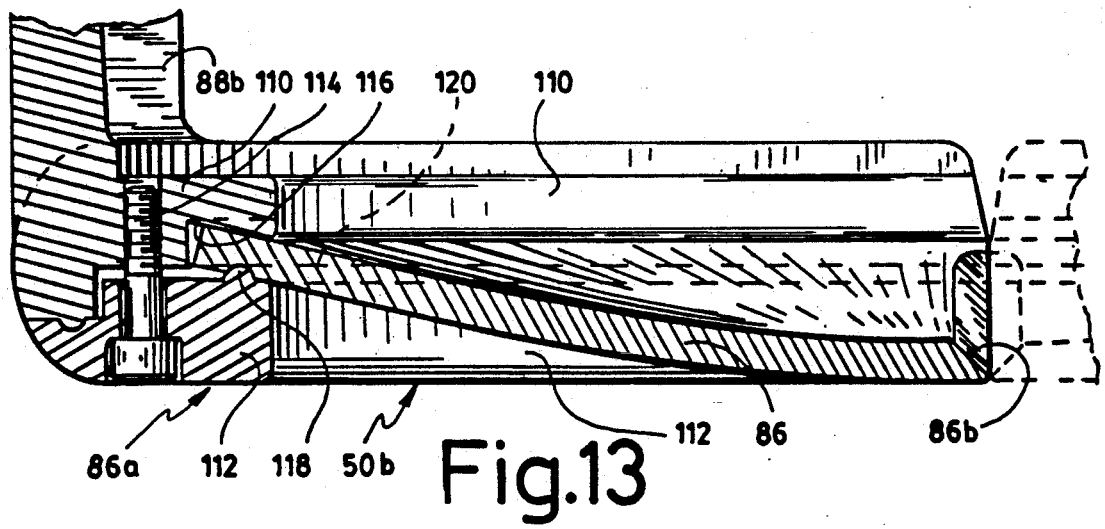
FIG. 13 is an enlarged cross-section taken along line 13—13 of FIG. 12.

Preferably also, and as clearly illustrated in FIGS. 13 and 15, the disc portion 86 of each jaw member 50a or 50b is convex relative to the underlying ground G. Moreover, the semicircular peripheral section 86a of each jaw member 50a, 50b is made from two similar sections 110, 112 taking in sandwich the peripheral edge of disk 86. To immobilize the disc 86 edgewisely between the separate edge sections 110, 112, a bolt 114 anchors the latter edge sections to one another while the free edge of disc 86 engages a slanted peripheral groove 116 made on the inner portion of the underface of the upper edge section 110, and with the lower edge section 112 being provided on the inner portion of its top face with a rounded peripheral ridge 118 engaging a correspondingly shaped groove 120 made on the underface of the peripheral edge section of disc 86. Edgewise section 110 is an integral portion of the bottom edge of the corresponding jaw supporting arm 88a or 88b, see FIG. 13.

As best seen in FIGS. 2, 4 and 8, pivot mount 48 consists of a rigid casing 122 provided with a through pivot axle 124. Axle 124 pivotally engages through the rear wall 46b of the felling head frame 46. Casing 122 carries an upwardly forwardly inclined extension 126, being endwisely connected to a substantially planar extension 127 of the rear edge of the frame top wall 46e, by a hydraulic ram 128. More particularly, extension 126 includes a free end yoke 130, carrying a transverse pivot axle 132, pivotally mounted the piston rod end 134 of ram 128, while extension 127 carries on its underface another yoke 136 with a transverse pivot axle 138 pivotally mounting the cylinder end 140 of ram 128. Axles 132 and 138 are parallel to one another and orthogonal to proximate casing wall 46b, for enabling limited roll motion of head 32 relative to boom 34, as suggested by the angular sector of FIG. 4.

It is envisioned that, in the felling head, the power means 128, as well as 80, 92, 94 and 66, 68 all be controlled remotely and individually by the truck operator inside cabin 36, through hydraulic lines running along boom 34 in a conventional fashion.

FIGS. 16 to 23 show how the knives 50a, 50b, the grabber arms 52a, 52b and the retaining lever 54 cooperate with one another during sequential cutting of the three upstanding trees. More than three upstanding trees can be captured, felled and retained per cycle of cutting, before unloading thereof is required. The total number of such trees in a single cutting cycle depends of course on the diameter of the trees and that of the loading area bounded by arcuate plate 82 and retaining lever 54, until all of this available diametral tree collecting area 82, 54 is tangentially occupied by the sectioned trees. The number of tree sections 42a', 42b' 42c', . . . are then carried by truck 30 rollingly through the forest toward a transport van (not shown), for releasing all the cut tree sections and unloading same thereon. The felling head can then be used for a second cycle of sequential tree cuttings.

The grabber arms and retaining lever are preferably contoured to maximize the tree capturing capacity of the felling head. It is envisioned that, due to the special configuration of the various ram means on the felling head, the forces applied by the grabber arms are such that there results a very small structural strain is sustained by the felling head frame 46. This in turn will promote longevity of the machine. Outer lever 72 of retaining member 54 should be tapering towards its thin free end or "leading edge", to facilitate its sliding displacement away from its position in between tree sections 42a' and 42'b, see FIG. 20.

Returning to FIG. 20, it is clearly shown how the retaining lever 54 can release one (or more) captured tree section (42a') even though an additional tree section 42b' has been captured by grabber arms 52a and 52b and is thus "in the way". Indeed, since the link between arms 70 and 72 of lever 54 is such that outer arm 72 may pivot inwardly toward inner arm 70, albeit against the elastic bias of elastomeric band 78, when releasing the captured tree 42'. In this way, the outer arm does not need for its release to sweep as wide a circle of arc as it did when engaging the tree section captured by the grabber arms. Thereafter, (FIG. 21) the lever member 54 is again pivoted inwardly to capture both tree sections, since the biasing strip 78 will have brought the outer leg of lever 54 to its normal position orthogonal to its inner leg.

Figure 20A:
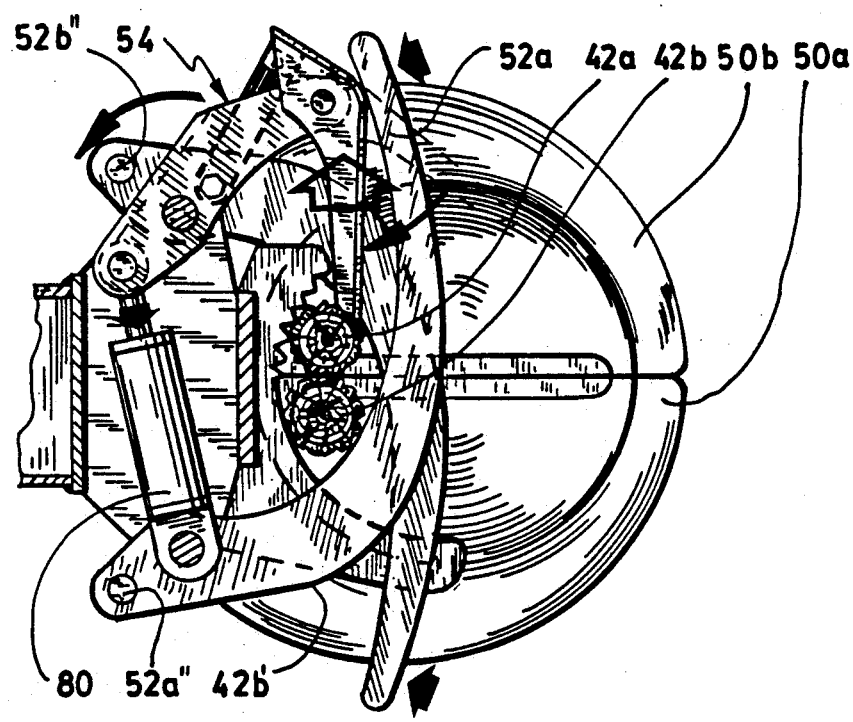
in FIG. 20a, on the last sheet of drawings, there is shown an enlarged, more detailed view of FIG. 20.
Figure 20B:
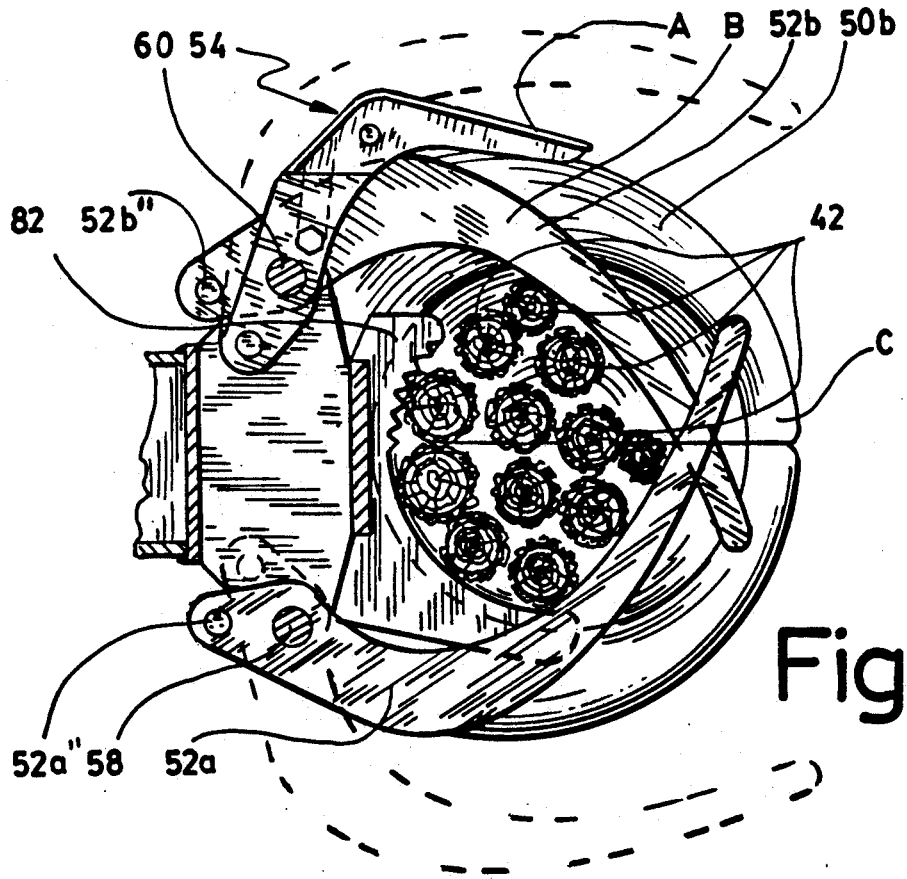

Clearly, the release and engagement sequence illustrated in FIGS. 19 to 21 will apply whatever the number of cut trees already captured within the loading area.

It is envisioned that the ram means of the pair of grabber arms and the ram means of the pair of knives be operatively connected to a common pair of hydraulic lines, in parallel, through T-couplings, i.e., that a first hydraulic fluid hose from a first grabber arm ram means and a second hydraulic fluid hose from a first knife are connected to a first main fluid hose through a first T-coupling, and similarly, a third hydraulic fluid hose from a second grabber arm ram means and a fourth hydraulic fluid hose from a second knife are connected to a second main fluid line through a second T-coupling. In this way, the grabber arms, which are lighter in weight than the knives, will initially pivot yieldingly under the hydraulic fluid bias, exclusively of the knives, until a good, firm grasp of the upstanding tree is reached. From then on, the hydraulic fluid will apply the additional torque onto the knives while maintaining the initial torque onto the grabber arms.

It is understood that, with such an arrangement, the torque applied by the grabber arms will be modulated as a function of the width of the upstanding tree selected for felling. Indeed, the effort applied by the grabber arms tangentially to the registering section of tree, under the bias of the hydraulic fluid, will be substantially exactly the same, whatever the diameter of the selected tree (within of course minimum and maximum limit tree diameters in relation to the overall structural dimensions of the grabber arms).

This constitutes a substantial improvement compared to existing felling heads, where the grabber arms had a "closed" position in which the distance between the two closed grabber arms was fixed, whatever the diameter of the selected tree. Such prior art felling head grabber arms would therefore apply destructively high tangential forces onto a tree of large diameter, and not enough force onto a diametrally smaller tree, wherein only "average", diameter size trees would be fully effective with these heads. Indeed, prior art felling heads were prone to structural breaks under such strain, a major disadvantage. The present invention overcomes to a large extent such a problem, as disclosed hereinabove.

Finally, in the present invention, once the knives have fully cut the tree section, all the hydraulic fluid torque is transferred to the upwardly located grabber arms, to more firmly grip the cut tree section to prevent same from vertical tilting over the knives under its own weight.

I claim:

1. A feller buncher unit comprising a main, rigid, elongated frame, a pair of coacting, heavy, knife members mounted to a lower end of said frame for tangentially cutting an upstanding tree, a pair of coacting, light, grabber members, mounted to an upper end of said frame in substantial register with said knife members for tangentially capturing and retaining said tree; each knife member being power operated by a corresponding ram means and each grabber member being power operated by a corresponding ram means; wherein the ram means of one knife member and of one grabber member being connected in parallel to a first main hydraulic fluid line and the ram means of the other knife member and of the other grabber member being connected in parallel to a second main hydraulic fluid line, whereby upon hydraulic fluid pressure being applied through said fluid line:

said grabber members ram means will initially be actuated exclusively of said knife members to tangentially capture said tree, until firm grasp thereof is effected by said grabber members;

the hydraulic fluid pressure will then be automatically transferred to said knife member ram means, to actuate said knife members to tangentially cut said tree while maintaining at least partial pressure onto said grabber members; and upon full sectioning of said tree being completed, said hydraulic fluid applied to said knife member ram means will be fully transferred to said grabber members ram means, to apply maximum tree retaining grabber arm torque against the cut tree portion to prevent tilting motion of the cut tree portion over said knife members.

2. A feller buncher unit for use with an automotive vehicle in a forest, said vehicle of the type having an elongated boom, said feller buncher comprising:

(a) a main rigid frame;
(b) coupler means for connecting said feller buncher main frame to said boom;
(c) ground skimming knife means, carried by said main frame for cutting an upstanding tree about a horizontal plane proximate ground level;
(d) grabber means, for capturing and retaining in substantially upright position the tree section cut by said knife means, within a loading area;
(e) a retaining member, for retaining said cut tree section captured by said grabber means within said loading area; said retaining member consisting of two pivoted inner and outer lever members, the inner lever member pivoted to said main frame by a first pivot means, the outer lever member pivoted to the inner lever member by a second pivot means, for pivotal motion of said inner and outer lever members about a horizontal plane; stop means, to prevent pivotal motion of said outer lever member relative to said inner lever member beyond a right angle limit position directed towards said tree loading area; power means, to power operate said inner lever member in its pivotal motion; whereby at least a second upstanding tree can be thereafter captured by said grabber arms, and cut by said knife means, before release of both cut trees from said loading area is required; said unit main frame including two transversely spaced, vertical axles, said grabber means including two vertically spaced apart grabber arms, pivotally carried by respective said vertical axles, said inner lever member pivotally carried by one of said vertical axles and vertically offset relative to said grabber arms; additional power means, to power operate said grabber arms in their pivotal motions; wherein said additional power means includes a pair of ram members, each ram member pivoted about second pivot axles to an inner end extension of a corresponding grabber arm and extending freely through a transverse passage in said unit main frame whereby, upon pivotal action of said grabber arms from an open, spread-apart condition, clearing said tree loading area, to a closed condition, superimposed over one another within said loading area, the first mentioned pair of grabber pivot axles shift from closer positions from one another within the area between said pair of second pivot axles to farther positions from one another beyond this area.

3. A feller buncher unit as in claim 2,
further including biasing means, to bias said outer lever member against said stop means in its said right angle position relative to said inner lever member.

4. A feller buncher unit as in claim 2, wherein each grabber arm is lengthwisely arcuate to conform tangentially to the circular shape of the upstanding tree to be captured.

5. A feller buncher unit as in claim 2,
wherein said knife means includes a pair of semi-circular plates, each having a straight cutting edge, each plate edgewisely carried by an arcuate arm defining inner and outer ends, an arm pivot means pivotally interconnecting an intermediate section of said arcuate arms to said feller main frame, and a pair of second ram members, one second ram member pivotally interconnecting the inner end of one arcuate arm with the outer end of the other arcuate arm and the other second ram member pivotally interconnecting the outer end of said one arcuate arm with the inner end of said other arcuate arm; whereby in the extended condition of said second ram members, the straight cutting edges of said semi-circular knife plates meet about a horizontal plane.

6. A feller buncher unit as in claim 5,
wherein each said knife plate is convexly shaped relative to the ground.

7. A feller buncher unit as in claim 2,
wherein said retainer outer lever member is smooth-surfaced and tapers towards a thin free end tip, to facilitate disengagement from said loading area from in between the cut tree sections secured by said grabber means.

8. A method of cutting upstanding trees in a forest with a feller buncher unit, the feller buncher defining a frame carrying a pair of ground skimming, coacting cutting knives, a pair of opposite, coacting grabber arms, a tree retaining lever, all pivotally carried about vertical axes for pivotal motion about vertically offset horizontal axes, and each powered by corresponding ram means; the method comprising the following steps:

(a) engaging with the feller unit a standing tree;
(b) capturing the standing tree with the grabber arms;
(c) retainingly engaging said captured tree with said retaining lever;
(d) sectioning the tree with said cutting knives;

(e) releasing said sectioned tree with said grabber arms and knives;
(f) engaging a second standing tree with the feller unit;
(g) retainingly engaging against said retaining lever section said second standing tree retained by said retaining lever;
(h) sectioning the second standing tree with said knives; wherein the ram means of a first knife and that of a first grabber arm are fed by a first common hydraulic fluid line, and the ram means of the second knife and that of the second grabber arm are fed by a second common hydraulic fluid line; and further including the following steps:
(aa) between steps (a) and (b), loading substantially all of the torque pressure of said hydraulic fluid in the grabber arms ram means;
(bb) between steps (c) and (d), once the grabber arms have firmly grabbed the tree, transferring the hydraulic fluid torque pressure to said knives ram means while maintaining forcible hydraulic fluid bias onto said grabber arm.

9. The method of cutting standing trees as defined in claim 8, with said retaining lever consisting of two pivotally interconnected inner and outer lever sections; further including the following steps:
(i) releasing the first sectioned tree with said outer lever section, and thereafter retainingly engaging both tree sections therewith;
(j) releasing both sectioned tree sections with said grabber arms and knives;
(k) engaging a third standing tree with the feller unit;
(l) capturing said third tree against said retaining lever outer lever section with said grabber arm; and
(m) sectioning said third tree with said knives.

10. A method of felling trees as in claim 18, further including the following step:
(dd) between steps (d) and (e), once the knives have fully sectioned the tree, transferring substantially all of the torque of said hydraulic fluid previously applied onto said knives ram means, to the grabber arms ram means, to prevent tilting motion of the cut tree portion over the knives.

* * * * *